United States Patent [19]

Müller et al.

[11] 4,003,796

[45] Jan. 18, 1977

[54] APPARATUS FOR MIXING A LIQUID PHASE WITH A GASEOUS PHASE

[75] Inventors: Hans Müller, Erlenbach; Konstantin Sotirianos, Stafa, both of Switzerland

[73] Assignee: Dr. Ing. Hans Muller, Mannedorf, Switzerland

[22] Filed: May 15, 1975

[21] Appl. No.: 577,749

[30] Foreign Application Priority Data

May 28, 1974 Switzerland ............... 7247/74

[52] U.S. Cl. .................... 195/142; 195/143; 261/93

[51] Int. Cl.² .......................... C12B 1/14

[58] Field of Search .......... 195/109, 139, 142, 143; 261/93, 121 R; 259/107, 108

[56] References Cited

UNITED STATES PATENTS

| | | | |
|---|---|---|---|
| 1,312,754 | 8/1919 | Rowand | 261/93 |
| 2,684,233 | 7/1954 | Payne | 261/93 |
| 2,983,652 | 5/1961 | Baerfuss | 195/143 |
| 3,409,130 | 11/1968 | Nakamura | 261/93 X |
| 3,847,750 | 11/1974 | Ridgway, Jr. et al. | 195/143 X |

*Primary Examiner*—Frank W. Lutter
*Assistant Examiner*—William A. Cuchlinski, Jr.
*Attorney, Agent, or Firm*—Michael J. Striker

[57] ABSTRACT

A vessel is adapted to accommodate a liquid phase containing a nutrient liquid and micro-organisms which are to be aerobically grown. A gaseous phase is admitted into the presence of the liquid phase, and the resulting mixture is advanced to a mixing chamber where it is uniformly mixed by a rotary element having a plurality of baffles extending across the path of the advancing mixture. Additional projections also extend across the path and define constrictions therein with the baffles so that the advancing mixture is thereupon dispersed prior to being expelled into the vessel. The rotary element also has a Venturi-shaped passage provided with a throat which is operative for generating a region of suction when the rotary element is rotated so that the rate of advance of the mixture is accelerated.

10 Claims, 3 Drawing Figures

APPARATUS FOR MIXING A LIQUID PHASE WITH A GASEOUS PHASE

BACKGROUND OF THE INVENTION

The present invention relates to a device for mixing a liquid phase and a gaseous phase and more particularly to an apparatus for enhancing the aerobic growth of micro-organisms such as yeast, fungi and bacteria.

In biological reactors or fermentation vessels of the type where micro-organisms are grown in a liquid broth, i.e. a body of fermentation-supporting liquid medium containing nutrient medium, it is vitally important to supply air or oxygen in sufficiently great quantities to the organisms so as to facilitate their growth and, hence, the progress of the biochemical reaction.

One such biological reactor has been described in the commonly owned copending application, Ser. No. 559,362, filed on Mar. 17, 1975.

Optimum growth conditions require intensive aeration. This aeration requirement, on the order of 2 through 3 parts gaseous medium to one part of substrate medium, causes the problem of requiring large amounts of gaseous medium to be introduced into the vessel under high pressure which, in turn, requires aa high air-compressor output.

It will be appreciated that when the vessels are relatively large and require on the order of several hundred cubic meters of air per minute such high compressor outputs require high electrical power inputs, usually on the order of several thousand kilowatts of electrical energy.

The costs of construction and operation of such an arrangement are prohibitive, especially in applications in the fields of producing nutrient and fodder proteins, i.e., the field of growing yeast, bacteria and fungi.

SUMMARY OF THE INVENTION

It is a general object of the present invention to overcome the disadvantages of the prior art devices.

More particularly, it is an object of the present invention to provide a device for aerating a liquid phase in an aerobic-cultivation vessel which is not possessed of the drawbacks of the prior art devices of a similar kind.

Another object of the present invention is to uniformly mix the gaseous phase with the liquid phase.

A further object of the present invention is to create a fine dispersion of said phases.

An additional object of the present invention is to provide an improved aeration device which is efficient and economic in operation.

In keeping with these objects and with others which will become apparent hereinafter, one feature of the invention resides in the provision of a vessel which is adapted to contain the liquid phase to be aerated. A gaseous phase is admitted into the presence of the liquid phase, and the resulting mixture is advanced towards a separate mixing chamber provided within the vessel. The mixture is uniformly mixed and dispersed in the mixing chamber prior to being expelled into the vessel.

These features overcome the prior art disadvantages by providing a very simple and efficient aeration device which finely disperses the phases in the vessel. The finely-dispersed liquid-gas mixture assures a good transfer of oxygen to the micro-organisms. This dispersion feature increases the contact area of each microorganism with oxygen and thus economizes the operation by necessitating that less electrical energy need be supplied to drive the compressor as compared with the prior art devices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
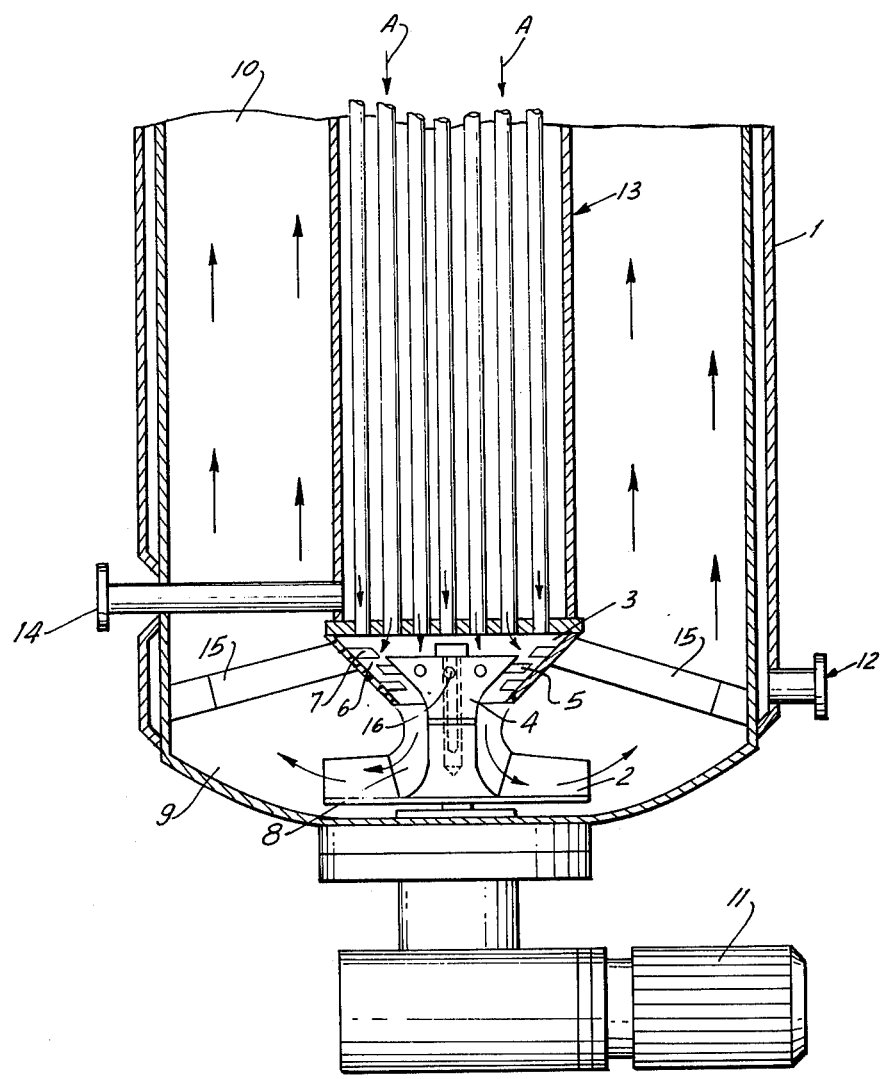
FIG. 1 is a partial longitudinal view of a device according to the present invention.
Figure 2:
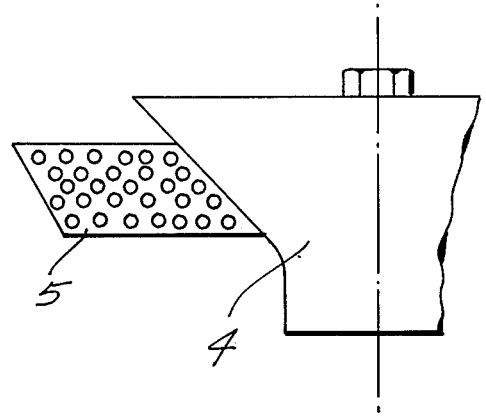
FIGS. 2 and 3 are enlarged partial views of other modifications of a detail of FIG. 1.

Discussing the apparatus which has been illustrated in an exemplary embodiment in FIG. 1, the reference numeral identifies the biological reactor or fermentation vessel which extends in the vertical or upright direction.

The vessel 1 has an interior chamber for the broth or fermentation-supporting liquid phase containing nutrient liquid and micro-organisms to be grown. The inlet or supplying means 12 is located at the lower region 9 of the vessel 1 and supplies the gaseous phase to the liquid phase.

A heat exchanger 3 is provided within the vessel and is fixedly mounted thereto by means of supports 15. The heat exchanger 13 is comprised of a bundle or array of parallel tubular elements, or helically-coiled tubular elements, or a plurality of tubulr elements mounted together to form linear sets of plate-shaped elements. The cooling medium, such as water or air, is supplied by inlet pipe 14 to a first heat-exchanging section of the heat exchanger 13 and is removed via a non-illustrated outlet pipe.

The gaseous phase may be supplied from the inlet 12 directly into the vessel 1, or it may be conducted to a plurality of non-illustrated introduction pipes which conduct the liquid phase and the entrained gaseous phase through the flow-through second heat exchanging section of the heat-exchanger 13, the phases 10 flowing together in the direction of the arrows A.

The phases 10 are advanced through the flow-through or second section of the heat-exchanger 13 towards the mixing chamber 3 drawn by the advancing means or rotary impeller 2. The power unit or drive means 11 is preferably an electric motor and drives a rotry extension element 4 and the rotary impeller 2. The rotary impeller 2, upon rotation, is operative to generate a region of suction within the chamber 3 so as to draw or advance the mixture 10 therein.

The rotary impeller 2 is hollow and has an axial inlet which communicates with the mixing chamber 3 plus also with outlet openings 8 located at the periphery of the impeller 2. The interior of the impeller 2 is subdivided by substantially radically-extending guide vanes.

When the impeller 2 rotates, the liquid and gas mixture found in the interior of the impeller is expelled due to centrifugal action. This expulsion causes suction downstream of the mixing chamber 3 and results in additional quantities of the mixture being axially drawn through the heat-exchanger and into the interior of the impeller.

The action of the impeller 2 is described in further detail in the commonly-owned copending applications Ser. Nos. 499,585 and 534,898.

The rotary extension element 4 extends into the mixing chamber 3 and is secured to an output shaft of the drive means 11 by means of conventional fastening means, such as the screw 16.

The mixing means comprises a plurality of rotating arm members or baffers 5 extending in across the path of the advancing mixture 10. The rotating arms 5 are spaced circumferentially about the rotary shaft element 4 and are preferably integral therewith.

Figure 3:
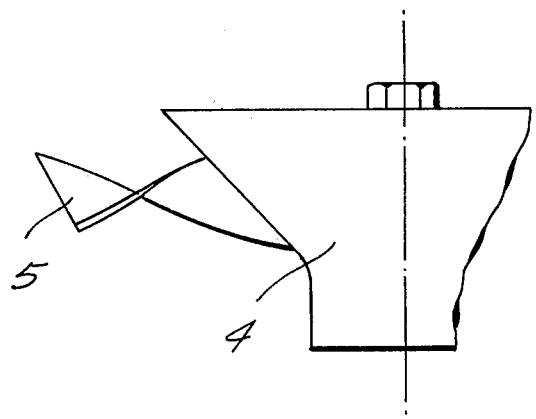

The arms 5 may linearly extend in the radical direction and assume a spoke-like pattern. Alternatively, the rotating arms 5 may partially extend in a curved manner in the circumferential direction and assume a spiral-like pattern as shown in FIG. 3. Alternatively, the rotating arms 5 may be shaped as perforated plates as shown in FIG. 3

The mixing and dispersing means further comprise a plurality of turbulence-causing projections 7 which extend into the path of the mixture of phases 10. At least one such projection 7 is stationary and is located in the mixing chamber 3 so as to define a gap 6 therewith and with the rotating arms 5. The mixture of phases 10 must traverse this constriction in the flow path so that eddies or turbulence are formed therein as the mixture issues past said gap 6.

Additional sets of rotating arms 5 may be provided downstream of the first mentioned set of rotating arms 5 in alternative and successive positions so as to form an interentwined comb-like configuration.

Upon traversing all of the rotating arms 5 and the stationary projections 7, the mixed and dispersed mixture 10 is guided by the radially-extending vanes having outlets towards the bottom portion 9 of the vessel 1 and thereupon upwardly and laterally around the heat-exchanger 13 and, in turn, recycled through the flow-through section of the heat-exchanger 13 again.

It is believed that the operation of the device is clear from the above description. The liquid phase, with or without being previously admixed with the gaseous phase, is conducted to the uppermost portions of the heat exchanger 13 where additional quantities of gaseous phase are admitted into the presence of the liquid phase. The gas-liquid mixture 10 flows through the flow-through sections of the heat-exchanger 13 being drawn by the advancing means 2. The mixture 10 exchanges heat with the cooling medium provided in the first section of the heat-exchanger 13.

It is understood that the biochemical reaction in the vessel 1 releases substantial amounts of exothermal energy, and that such thermal energy must be removed from the fermentation-supporting mixture in order to enhance the further growth of the micro-organisms.

In the chamber 3 of the advancing means 2, the mixture 10 is first mixed and cavitated by the rotating arms 5 and then dispersed by means of the constrictions caused in the flow path by the stationary projections 7. The fine dispersion thus produced issues from the chamber 3 into the bottom portion 9 of the vessel 1 as a finely dispersed liquid-gas mixture whose specific weight is relatively small. Thereupon, the mixture 10 continues to flow upwardly and to circulate towards the uppermost portions of the heat-exchanger 13 where it is again admixed with gaseous phase and recycled downwardly towards the chamber 3 again. Thus, an improvement in the aeration of the mixture 10 is achieved.

In the preferred embodiment, the biological reaction is utilized for biological fermentation or for any other chemical reaction requiring an exceptionally close admixture of gas and liquid phases. It is advantageous if the gaseous phase is air or oxygen-enriched air, and the liquid phase is a nutrient liquid, such as molasses.

It will be understood that each of the elements described above, or two or more together, may also find a useful application in other types of constructions differing from the types described above.

While the invention has been illustrated and described as embodied in a apparatus for mixing a liquid phase with a gaseous phase, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a fermentation device for mixing a fermentation liquor containing micro-organisms with a gaseous phase, a combination comprising a vessel having an interior adapted to contain liquor to be aerated with gaseous phase; a conically-shaped mixing chamber mounted in said vessel and having an inlet and an outlet which is in communication with said interior of said vessel; conveying means intermediate said vessel and said chamber for communicating the interior of said vessel with said inlet and adapted to cause liquor and gaseous phase contained in the vessel to flow along a path through said chamber; mixing and dispersing means including a rotary element mounted for turning movement in said chamber and a plurality of substantially radially-extending baffles mounted in said chamber intermediate said inlet and said outlet thereof so as to extend in direction generally transversely of the path, said rotary element being formed with a venturi-shaped passage composed of a throat portion downstream of said baffles which is in communication with said outlet, whereby centrifugally-created suction generated by said throat portion is adapted to draw liquor and gaseous phase through said chamber so as to become mixed therein prior to centrifugal ejection of the thus aerated liquor from said outlet into said vessel.

2. A device as defined in claim 1, wherein said baffles extend linearly in the radial direction.

3. A device as defined in claim 1, wherein said baffles partially extend in the circumferential direction about said rotary element and are curved in a spiral-like configuration.

4. A device as defined in claim 1, wherein said baffles are perforated plates.

5. A device as defined in claim 1, wherein said mixing and dispersing means further comprises a plurality of turbulence-causing projection members in said mixing chamber, said projection members defining a constriction with said baffles in said path.

6. A device as defined in claim 3, wherein said projection members are stationary.

7. A device as defined in claim 6, wherein said stationary projection members and said baffles are alternately and successively positioned and assume an interentwined configuration.

8. A device as defined in claim 1, wherein said gaseous phase is air, and said liquor is nutrient liquid containing micro-organisms.

9. A device as defined in claim 1; and further comprising means for driving said rotary element so as to generate suction in said Venturi-shaped passage.

10. A device as defined in claim 1, and wherein said plurality of radially-extending baffles are spaced circumferentially of each other about said rotary element.

* * * * *